US010978303B1

(12) United States Patent
Smayling et al.

(10) Patent No.: US 10,978,303 B1
(45) Date of Patent: Apr. 13, 2021

(54) SECURE PERMANENT INTEGRATED CIRCUIT PERSONALIZATION

(71) Applicant: Multibeam Corporation, Santa Clara, CA (US)

(72) Inventors: Michael C. Smayling, Fremont, CA (US); David K. Lam, Saratoga, CA (US)

(*) Notice: Subject to any disclaimer, the term of this patent is extended or adjusted under 35 U.S.C. 154(b) by 0 days.

(21) Appl. No.: 16/400,788

(22) Filed: May 1, 2019

Related U.S. Application Data

(63) Continuation of application No. 15/260,987, filed on Sep. 9, 2016, now Pat. No. 10,312,091.

(60) Provisional application No. 62/351,529, filed on Jun. 17, 2016, provisional application No. 62/240,536, filed on Oct. 13, 2015.

(51) Int. Cl.
| | |
|---|---|
| *H01L 21/263* | (2006.01) |
| *H04L 9/30* | (2006.01) |
| *H01L 23/00* | (2006.01) |
| *H01L 21/3065* | (2006.01) |
| *G06F 21/60* | (2013.01) |
| *H01L 23/544* | (2006.01) |

(52) U.S. Cl.
CPC .......... *H01L 21/263* (2013.01); *G06F 21/602* (2013.01); *H01L 21/3065* (2013.01); *H01L 23/573* (2013.01); *H04L 9/30* (2013.01); *G06F 2221/2143* (2013.01); *H01L 23/544* (2013.01); *H01L 2223/54413* (2013.01); *H01L 2223/54433* (2013.01); *H01L 2223/54473* (2013.01)

(58) Field of Classification Search
CPC ................. G06F 21/606; G06F 21/602; G06F 2221/2143; H01L 21/263; H01L 21/3065; H01L 21/0274; H01L 2223/54473; H01L 2223/54433; H01L 2223/54413; H01L 23/573; H01L 21/67259; H01L 23/544; H01L 9/0861; H01L 9/30
See application file for complete search history.

(56) References Cited

U.S. PATENT DOCUMENTS

| | | | | |
|---|---|---|---|---|
| 5,005,138 A | * | 4/1991 | Tobuse | H01J 37/3023 250/492.2 |
| 5,012,105 A | * | 4/1991 | Ando | B82Y 10/00 250/398 |

(Continued)

*Primary Examiner* — Helen Rossoshek
(74) *Attorney, Agent, or Firm* — Seth A. Horwitz; Carrington, Coleman, Sloman & Blumenthal, L.L.P.

(57) ABSTRACT

Methods, systems and devices for using charged particle beams (CPBs) to write different die-specific, non-volatile, electronically readable data to different dies on a substrate. CPBs can fully write die-specific data within the chip interconnect structure during the device fabrication process, at high resolution and within a small area, allowing one or multiple usefully-sized values to be securely written to service device functions. CPBs can write die-specific data in areas readable or unreadable through a (or any) communications bus. Die-specific data can be used for, e.g.: encryption keys; communications addresses; manufacturing information (including die identification numbers); random number generator improvements; or single, nested, or compartmentalized security codes. Die-specific data and locations for writing die-specific data can be kept in encrypted form when not being written to the substrate to conditionally or permanently prevent any knowledge of said data and locations.

5 Claims, 10 Drawing Sheets

(56) References Cited

U.S. PATENT DOCUMENTS

| | | | |
|---|---|---|---|
| 5,036,209 A * | 7/1991 | Kataoka | B82Y 10/00 250/398 |
| 5,078,771 A * | 1/1992 | Wu | C03C 4/06 65/30.11 |
| 5,177,365 A * | 1/1993 | Yamada | B82Y 10/00 250/492.2 |
| 5,260,579 A * | 11/1993 | Yasuda | B82Y 10/00 250/492.2 |
| 5,770,863 A * | 6/1998 | Nakasuji | B82Y 10/00 250/396 R |
| 5,879,842 A * | 3/1999 | Okino | B82Y 10/00 430/22 |
| 6,355,994 B1 | 3/2002 | Andeen | |
| 6,617,587 B2 | 9/2003 | Parker | |
| 6,700,122 B2 * | 3/2004 | Matsui | H01J 37/28 250/310 |
| 6,734,428 B2 | 5/2004 | Parker | |
| 6,738,506 B2 | 5/2004 | Miller | |
| 6,777,675 B2 | 8/2004 | Parker | |
| 6,844,550 B1 | 1/2005 | Yin | |
| 6,872,958 B2 | 3/2005 | Andeen | |
| 6,943,351 B2 | 9/2005 | Parker | |
| 6,977,375 B2 | 12/2005 | Yin | |
| 7,116,817 B2 * | 10/2006 | Tanaka | G01N 23/2251 382/149 |
| 7,122,795 B2 | 10/2006 | Parker | |
| 7,227,142 B2 | 6/2007 | Parker | |
| 7,238,294 B2 | 7/2007 | Koops | |
| 7,316,934 B2 | 1/2008 | Mangell | |
| 7,378,003 B2 | 5/2008 | Athas | |
| 7,435,956 B2 | 10/2008 | Parker | |
| 7,456,402 B2 | 11/2008 | Parker | |
| 7,462,848 B2 | 12/2008 | Parker | |
| 7,476,880 B2 * | 1/2009 | Buller | B82Y 10/00 250/492.22 |
| 7,655,907 B2 * | 2/2010 | Tanimoto | H01J 37/265 250/307 |
| 7,786,454 B2 | 8/2010 | Parker | |
| 7,928,384 B2 * | 4/2011 | Cheng | G01N 23/04 250/310 |
| 7,928,404 B2 | 4/2011 | Parker | |
| 7,941,237 B2 | 5/2011 | Parker | |
| 8,242,457 B2 | 8/2012 | Parker | |
| 8,384,048 B2 | 2/2013 | Wiesner | |
| 8,507,159 B2 * | 8/2013 | Wang | H01J 37/3026 430/296 |
| 8,586,949 B2 * | 11/2013 | Dinu-Gurtler | B82Y 10/00 250/396 R |
| 8,624,205 B2 * | 1/2014 | Seto | B82Y 10/00 250/492.2 |
| 8,629,394 B2 * | 1/2014 | Madokoro | H01J 37/153 250/306 |
| 8,658,994 B2 * | 2/2014 | Zani | B82Y 10/00 250/492.3 |
| 8,832,465 B2 | 9/2014 | Gulati | |
| 8,999,627 B1 | 4/2015 | Lam | |
| 8,999,628 B1 | 4/2015 | Lam | |
| 9,184,027 B1 | 11/2015 | Lam | |
| 9,207,539 B1 | 12/2015 | Lam | |
| 9,286,675 B1 * | 3/2016 | Shabtay | G06T 7/0012 |
| 9,453,281 B1 | 9/2016 | Prescop | |
| 9,466,463 B1 | 10/2016 | Lam | |
| 9,466,464 B1 | 10/2016 | Lam | |
| 9,478,395 B1 | 10/2016 | Monahan | |
| 9,556,521 B1 | 1/2017 | Prescop | |
| 9,595,419 B1 | 3/2017 | Monahan | |
| 9,620,332 B1 | 4/2017 | Lam | |
| 9,673,114 B1 | 6/2017 | Lam | |
| 9,691,709 B2 * | 6/2017 | Leobandung | H01L 22/10 |
| 9,822,443 B1 * | 11/2017 | Smayling | H01L 21/0262 |
| 9,824,859 B1 | 11/2017 | Smayling | |
| 9,881,817 B1 | 1/2018 | Lam | |
| 9,981,293 B2 * | 5/2018 | Smits | H01J 37/02 |
| 10,020,166 B1 * | 7/2018 | Monahan | H01J 37/3177 |
| 10,020,200 B1 | 7/2018 | Monahan | |
| 10,026,589 B1 * | 7/2018 | Monahan | H01J 37/3045 |
| 10,341,108 B1 * | 7/2019 | Smayling | G06F 21/73 |
| 10,386,722 B2 * | 8/2019 | Borodovsky | H01J 37/3177 |
| 10,523,433 B1 * | 12/2019 | Monahan | H04L 9/30 |
| 10,659,229 B1 * | 5/2020 | Smayling | H04L 9/0866 |
| 2002/0195574 A1 * | 12/2002 | Tanaka | G01N 23/2251 250/492.3 |
| 2007/0057204 A1 * | 3/2007 | Kruit | B82Y 10/00 250/492.23 |
| 2008/0121804 A1 * | 5/2008 | Nakasuji | H01J 37/073 250/310 |
| 2011/0251713 A1 * | 10/2011 | Teshima | H01J 37/3056 700/110 |
| 2012/0112068 A1 * | 5/2012 | Maeda | H01J 37/20 250/310 |
| 2013/0040458 A1 * | 2/2013 | Scott | H01L 21/0337 438/669 |
| 2014/0065548 A1 * | 3/2014 | Sato | G06T 5/006 430/296 |
| 2017/0102615 A1 * | 4/2017 | Borodovsky | H01L 21/31144 |
| 2018/0293720 A1 * | 10/2018 | Yoshitake | G03F 1/42 |
| 2019/0019649 A1 * | 1/2019 | Winkler | H01J 37/045 |

* cited by examiner

SECURE PERMANENT INTEGRATED CIRCUIT PERSONALIZATION

CROSS-REFERENCE

This application claims priority as follows: this application is a non-provisional of U.S. Provisional Pat. App. No. 62/240,536, filed Oct. 13, 2015, and is a non-provisional of 62/351,529, filed Jun. 17, 2016, which are hereby incorporated by reference.

ACKNOWLEDGMENT OF GOVERNMENT SUPPORT

This invention was made with Government support under contract FA9453-13-C-0252 awarded by the United States Air Force. The Government has certain rights in the invention.

BACKGROUND

The present application relates to methods, devices and systems for writing IC-specific (integrated circuit-specific) information to semiconductor wafers using one or more charged particle beam columns, and more particularly to using charged particle beams to securely write wafers during wafer fabrication with secure non-volatile data that is customizable per-IC.

Note that the points discussed below may reflect the hindsight gained from the disclosed inventions, and are not necessarily admitted to be prior art.

Security software plays important roles defending against device hacking and cyber intrusion. Software has been deployed at multiple levels of communication networks to secure data centers ("the cloud"), Internet links, gateways, and individual devices. Antivirus, anti-malware, and firewall software also provide some protection against cyberattacks. However, networks and devices are safe only until attackers find ways around the defense.

The strength of encryption systems used to protect electronics systems, networks, and infrastructure depends on unique, unpredictable, keys. Reliance on user-generated passwords (which are typically neither unique nor unpredictable) or on cryptographic keys generated by software (which might be subverted, sidestepped, or compromised) has not prevented wide-scale data theft, eavesdropping, hijacking of systems (e.g., "ransomware"), and other "cyber" crime.

Software coding errors, bugs, design errors, unforeseen code interactions, and other software flaws are both typical and often give rise to significant vulnerabilities. Finding such vulnerabilities is generally expensive and time consuming. Vulnerabilities are also frequently introduced deliberately, e.g., "backdoors" required by software providers to access users' software for updates, bug fixes, debugging, and other useful or valuable (or other) purposes. These are examples of types of vulnerabilities that have been discovered and exploited by cybercriminals.

Hardware-embedded security can be used to fortify cyber defense and avoid or remedy many of the problems with software-based security. Hardware-embedded security can be implemented using integrated circuit (IC) personalization to physically instantiate chip-specific (unique) and unpredictable security keys. However, most ICs are patterned using optical lithography, which is not generally conducive to per-IC customizable design.

In optical lithography, patterning a circuit layer is done through a photomask (mask) in cookie-cutter fashion. Chips patterned using the same mask set are identical. This is a big benefit in volume production. However, a mask set generally costs weeks and millions of dollars to manufacture, and the design layout expressed through the mask is static, not intrinsically enabling embedding chip-specific information during fabrication.

Because photo-mask information is fixed, all chips of a given design on a wafer receive the same pattern from optical lithography. Commercial-scale batches of ICs are generally produced such that most or all ICs in the batch are effectively identical to one or more (frequently all) other ICs in the batch at the time when IC fabrication is completed. IC personalization for security generally either happens after fabrication, or not at all.

Currently available hardware solutions for IC personalization include fuse-programmable integrated circuits, Flash memory and physically unclonable functions ("PUFs"). These approaches do not embed chip-specific information in interconnects within the IC.

In the fuse-programmable integrated circuit approach, after ICs are produced, encrypted information is written on each individual IC to enhance security. But the fusing operation is typically outsourced and the data to be written is exposed to potential access by, or through vulnerabilities in the systems and operations of, the third party performing the fusing operation (typically the post-fabrication test operator). As a result, trust and security can be compromised. (Third party security issues can be avoided in the case of integrated device manufacturers ("IDMs"), where all steps from design to fabrication (fab) to test to packaging are performed and controlled by the IDM; but IDMs tend to be a minority of device producers.) Apple's Secure Enclave is an example of a fuse-programmable approach to hardware-embedded information unique to each IC, and is disclosed in U.S. Pat. No. 8,832,465, which is incorporated herein by reference.

Though Flash memories are often described or advertised as non-volatile, Flash memories have data retention times of about five to ten years (or less). This may be acceptable for fleeting consumer products, but it is likely inadequate for some types of IoT (Internet of Things) or PLC (Programmable Logic Controller) devices that are connected to or are integral parts of critical infrastructure. Data in Flash is also generally visible external to the IC on which it is written, making the data vulnerable to external access and/or manipulation.

A physical unclonable function (PUF) establishes a data string which depends upon partially random physical characteristics of an IC. The physical characteristics are caused by variations during the manufacturing of the IC. Process variations during IC manufacturing are both unavoidable and difficult to reproduce. Thus, in principal, PUFs can be used to establish unique, unreproducible, data strings for each IC. However, the contents of a PUF cannot be predetermined, and PUF responses are somewhat noisy. Furthermore, PUF responses may change with temperature or time, or may be read from, or derived from, memory. An example of a PUF is a volatile memory which at power-up has contents that depend on the partially random physical characteristics of the memory. Manufacturing variations lead to different physical characteristics for different memories. See U.S. Pat. App. Publ. 20140325237, which is incorporated herein by reference.

SUMMARY

The present application discloses new approaches to systems, devices and methods for secure permanent personalization of integrated circuits using charged particle beams. By combining fixed design information comprising the bulk of an IC's pattern with limited potential write positions corresponding to selectable personalized-per-IC data values, charged particle beams can write unique customized data to each IC, for an arbitrarily large number of ICs. Further, charged particle beams can do so with commercially useful throughput, securely, and using data values that are preselected or generated at write time (whether randomly or according to algorithms).

Personalized data values and related chip architecture can be tailored to a variety of applications, for example, embedded encryption keys or data supporting generation of encryption keys, communications address(es), serial numbers, and data supporting a random number generator function.

Personalized data values written using charged particle beams are secure, reliable, truly non-volatile, and can be designed to meet a desired level of accessibility of written data (ranging from fully accessible to fully inaccessible) by the manufacturer, input/output ports on the IC, and various functional units within the IC.

Personalized data values can be made inaccessible (kept secret, including from the customer and manufacturer) by using an encrypted data path from data generation through substrate processing and beyond.

BRIEF DESCRIPTION OF THE DRAWINGS

The disclosed inventions will be described with reference to the accompanying drawings, which show important sample embodiments and which are incorporated in the specification hereof by reference, wherein.

DETAILED DESCRIPTION OF SAMPLE EMBODIMENTS

Figure 1:
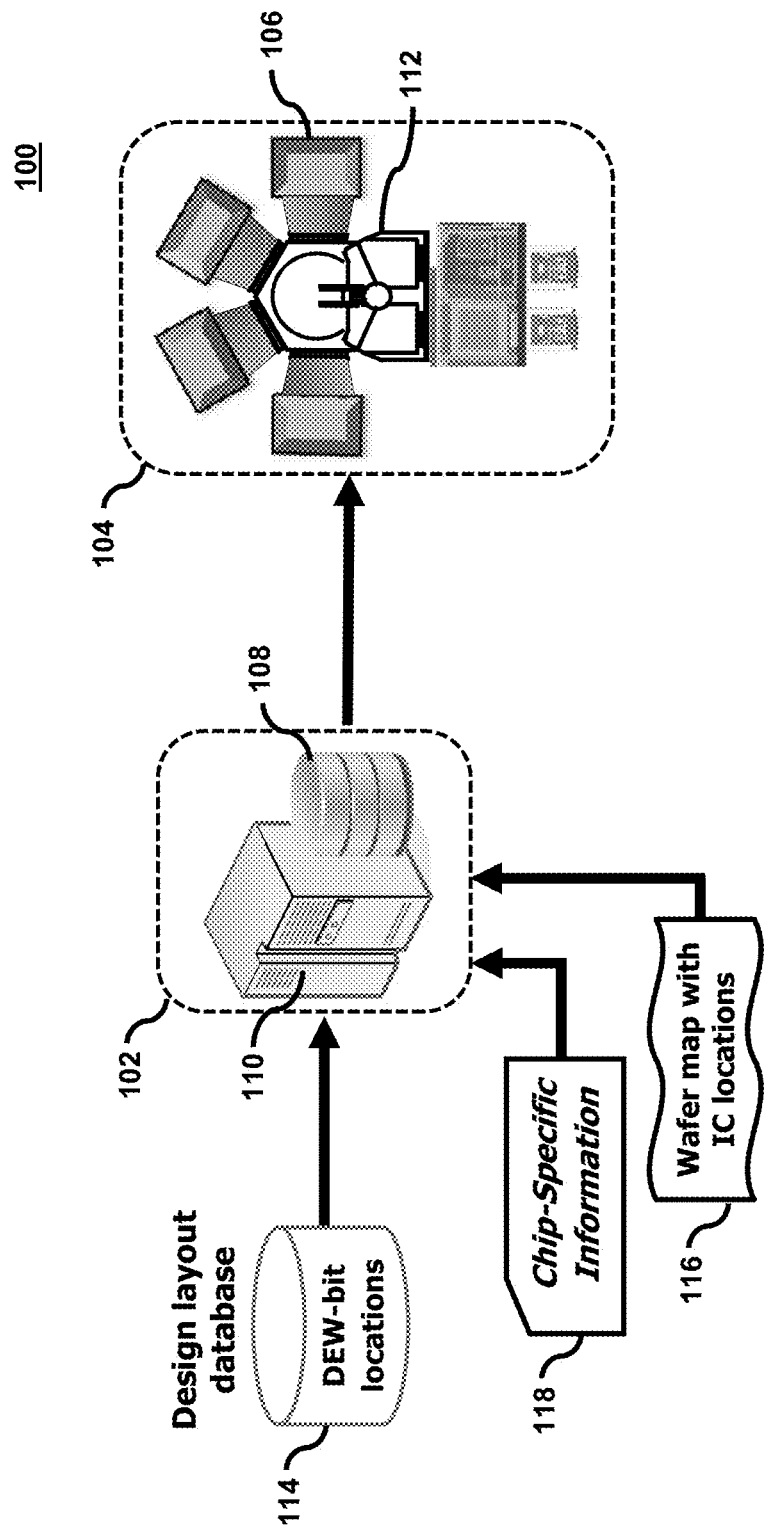
FIG. 1 schematically shows an example of a charged particle beam system for writing embedded secure data.

The numerous innovative teachings of the present application will be described with particular reference to presently preferred embodiments (by way of example, and not of limitation). The present application describes several inventions, and none of the statements below should be taken as limiting the claims generally.

The present application discloses new approaches to systems, devices and methods for secure permanent personalization of integrated circuits using charged particle beams. By combining fixed design information comprising the bulk of an IC's pattern with limited potential write positions corresponding to selectable personalized-per-IC data values, charged particle beams can write unique customized data to each IC, for an arbitrarily large number of ICs. Further, charged particle beams can do so with commercially useful throughput, securely, and using data values that are preselected or generated at write time (whether randomly or according to algorithms).

Personalized data values and related chip architecture can be tailored to a variety of applications, for example, embedded encryption keys or data supporting generation of encryption keys, communications address(es), serial numbers, and data supporting a random number generator function.

Personalized data values written using charged particle beams are secure, reliable, truly non-volatile, and can be designed to meet a desired level of accessibility of written data (ranging from fully accessible to fully inaccessible) by the manufacturer, input/output ports on the IC, and various functional units within the IC.

Personalized data values can be made inaccessible (kept secret, including from the customer and manufacturer) by using an encrypted data path from data generation through substrate processing and beyond.

The disclosed innovations, in various embodiments, provide one or more of at least the following advantages. However, not all of these advantages result from every one of the innovations disclosed, and this list of advantages does not limit the various claimed inventions.

Enables writing of non-volatile data in interconnects;
improved hardware security;
improved hardware root of trust;
improved random number generator;
enables secure writing of non-volatile data, with a preselected degree of availability of written data values outside writing tool, from none to arbitrarily broad;
data is written during wafer fabrication, avoiding potential third-party security issues;
data written in interconnects is non-volatile for the lifetime of the IC;
fast writing of non-volatile data in interconnects;
minimal design impact;
data written in interconnects is reliable, and does not change with temperature or time;
faster encryption/decryption;
secure non-volatile storage of private keys;
secure non-volatile storage of information used to generate keys;
faster generation of keys;
sensitive cryptographic information NOT stored in memory;
sensitive cryptographic information NOT accessible through any communications bus.

Some exemplary parameters will be given to illustrate the relations between these and other parameters. However it will be understood by a person of ordinary skill in the art that these values are merely illustrative, and will be modified by scaling of further device generations, and will be further modified to adapt to different materials or architectures if used.

Charged particle beam columns can be used to write chip-specific information to a wafer with throughput sufficient for volume production. Selected holes and/or cuts (for example, a single cut feature per bit), designated in advance or calculated by the writing tool on the fly from data to be written, can be combined with static design information to implement chip-specific non-volatile data.

Charged particle beam systems comprising one or more charged particle beams can be used to personalize IC's (preferably each IC in a production run) using electron beam direct writing, CEBL (complementary electron beam lithography, in which optical lithography used to write a line pattern and electron beam lithography used to write a cut pattern are applied to implement 1-D gridded design), direct etch, direct deposition, or other IC pattern-writing techniques. Commercially reasonable throughput can be achieved without limiting writing to a fixed pattern.

A charged particle beam system can comprise one or more charged particle beam columns for writing pattern to a semiconductor wafer or other substrate. Pattern can be written by, for example, using the beams to change solubility of an appropriate resist in a developer solution (lithography), or by directly depositing, removing or modifying material on or in the substrate.

Direct deposition of material by a charged particle beam tool is disclosed by, for example, U.S. patent application Ser. No. 14/745,463, which is incorporated herein by reference. Direct removal of material by a charged particle beam tool (e.g., direct etch) is disclosed by, for example, U.S. patent application Ser. No. 14/694,710, which is incorporated herein by reference. Direct modification of material by a charged particle beam tool is disclosed by, for example, U.S. patent application Ser. No. 14/980,884, which is incorporated herein by reference. Systems, methods and tools for etching cut features and depositing pattern material into said cut features within a single pass is disclosed by, for example, U.S. patent application Ser. No. 15/171,922, which is incorporated herein by reference.

As used herein, "embedded secure data" refers to data written by one or more charged particle beams into interconnects in an IC.

"Embedded" refers to the ability to write the secure data deep within the surface of the chip, e.g., in the Metal-1 or Via-1 layer, immediately after transistors are laid down. By placing features determining embedded secure data values deep within the IC surface, the cost, time and resources required to determine the embedded secure data values by physical examination of the packaged IC can be significantly increased.

"Secure" data refers both to the ability to securely write the data to the chip so that only selected parties—or no one at all (potentially ever)—knows the value(s) written (potentially with different circles of knowledge for different data values written to an IC); and to the ability to use the secure data (e.g., public/private key pairs) to substantially increase the time and resource cost to attack (hack) the chip in which the data is embedded and/or systems in which the chip is embedded. Secure data is chip-specific; preferably, every chip is different, meaning that successfully guessing the secure embedded data of a single chip (potentially enabling a hack) will generally confer no advantage in guessing the secure embedded data of another chip.

Embedded secure data, securely written by one or more charged particle beams into each (or substantially each) IC, can replace, supplement or complement writing of sensitive non-volatile data into the IC after fabrication (non-volatile data written after fabrication is typically written during testing, before or after packaging). Embedded secure data can comprise unique or random codes written into IC areas isolated from busses (and, preferably, from Input/Output ports) but usable by selected embedded functional units, such as an encryption engine or a random number generator 806. Embedded secure data can also comprise unique or random codes written such that the secure data is accessible by on-chip bus and/or is externally accessible, e.g., for a hardware-encoded communications address (such as an IPv6 address) or an IC-identifying number (e.g., an electronically readable ID number unique to each IC).

Where appropriate in context herein, references to substrate "locations" relating to writing or preparing to write cut features (cuts and/or holes) to a substrate using charged particle beams are intended to also refer to beam deflection and other charged particle beam control parameters used to write cut features to said locations.

FIG. 1 schematically shows an example of a charged particle beam system for writing embedded secure data 100. In embodiments as illustrated, a Data Preparation System 102 prepares chip-specific data to be written onto a substrate by a charged particle beam tool 104 comprising one or more charged particle beam writing modules 106 and wafer transport system 112. The Data Preparation System 102 comprises a database 108 storing chip-specific data to be written, and a processor 110 which uses the chip-specific data to provide the writing module(s) 106 information to be used to perform the writing, e.g., locations on the wafer where the writing module(s) will write pattern to express the chip-specific data in electronically functional features on the wafer. The Data Preparation System 102 can accept from an external source a design layout database with the locations of cuts or holes to be written or not 114, a file with location of each IC on the wafer (wafer map) 116, and a file containing chip-specific data or algorithms to generate chip specific data 118 to be written by the charged particle beam tool 104, or use an algorithm and/or a random number generator built into the Data Preparation System 102 to designate the chip-specific data to be written by the charged particle beam tool 104. The files containing design layout database and chip-specific information can be generated by the chip designer, encrypted for transfer, and then decrypted by the data-prep system in the chip fabrication facility.

Given appropriate circuit design and layout, a charged particle beam system 100 can fully write chip-specific data to a die in milliseconds (for example), and using minimal chip surface area. See, e.g., FIGS. 3-5.

The Data Preparation System 102 can generate "on the fly" chip-specific data to be written. Because the charged particle beam tool 104 does not require masks, and because the processor 110 can automatically (without human intervention) determine locations to be written, the Data Preparation System 102 can autonomously generate the chip-specific data to be written (preferably, within specified parameters) AND determine the wafer locations to implement said chip-specific data. This allows the chip-specific data and the corresponding wafer locations written by the charged particle beam tool to be isolated to the charged particle beam system 100. This means that it is a design decision as to whether (and/or which of) such data and locations as-written are available or accessible outside the charged particle beam system 100.

On-the-fly calculation of writing locations by the charged particle beam system 100 is enabled by static circuit design and layout infrastructure which, along with the features written by the charged particle beam tool 104, express the chip-specific data on the wafer. See, e.g., FIGS. 3-5.

A "secure tool" is defined herein as a tool designed to prevent fab or operator access to or modification of security information (e.g., values, locations, and inspection data of chip-specific features written to potential write locations); and is further defined as including a hardware security module that safeguards and manages digital keys for strong authentication and encryption and decryption of information. Preferably, a charged particle beam system 100 is a secure tool.

One or more chip-specific, unique, secure data values can be inserted in ICs during production, preferably so that one or more different data values is inserted into each different IC, to complement one or more of a variety of useful applications. Some or all of the data values written can be recorded to be available to, for example, customers, manufacturers, testers, or device feature managers (e.g., communication subscription plan managers, employers, information technology assistance, or installed application managers or distributors).

Alternatively and in addition, some or all of the data values written can be "forgotten"—deleted from memory of the charged particle beam system 100, or otherwise not made available or deliberately made unrecoverable outside the charged particle beam system 100 (e.g., using encryption). Forgetting can be a feature of the charged particle beam system 100 itself, limiting the number and scope of fabrication tools and other resources that must be trusted (in the security sense) to securely guarantee embedded secure data that is unknown, inaccessible and unpredictable. Further, forgetting avoids the risk of a human or electronic external system being compromised to allow a third party to obtain secure data and thereby compromise the die (or the system protected by the die) containing the secure data. Forgetting can also be used to create secure embedded data that no human has knowledge of, and that no human has the ability to access (at least, without extraordinary expenditure of time and/or resources). The ability to securely "forget" chip-specific data is related to the ability of a charged particle beam tool 100 to write pattern to a substrate without a mask: a charged particle beam tool 100 uses electronic data, rather than a physical mask set, to specify write locations. It is generally true that electronic data can be made inaccessible via deletion or encryption.

As used herein, "unpredictable" data is defined as data such that the numerical value of an arbitrary instance of such data cannot be predicted from knowledge of numerical values and other fabrication information of an arbitrarily large number of other instances of such data ("unpredictable" data written to other chips and/or to other locations on the same chip for the same or other application(s)). Preferably, knowledge of an algorithm used to generate unpredictable data also does not enable prediction of the numerical value of an arbitrary instance of such data.

Writing module(s) 106 can write pattern to wafers as part of the fabrication process, rather than as a post-fabrication structural modification of the IC's finished physical layout (such as fuse burning). Movement of individual wafers is typically minimized during fabrication to avoid potential defect-causing events. Consequently, the entity(ies) and personnel performing the charged particle beam data-writing process will generally be the same—and therefore, just as trusted (in the security sense)—as those performing the lithography, CEBL, or other wafer-writing process(es) used to write the rest of the IC pattern. Various third-party due diligence, contracting, security, and other trust issues that might otherwise be implicated by a process used to write embedded secure data can thereby be not merely mitigated, but avoided.

Embedded secure data written by a charged particle beam tool 100 can have a significantly smaller physical size on chip (and place less stress on the chip, potentially improving yield) than other methods of chip personalization, which generally require significantly larger amounts of die area: for example, laser cutting, fusing, anti-fuses, eFuses, non-volatile memories, and PUFs (physically unclonable functions). The smaller physical size allows placement of embedded secure data or other chip-specific data into multiple functional units within an individual chip (e.g., each control block in a chip).

Embedded secure data written by a charged particle beam tool 100 is truly non-volatile, i.e., interconnects expressing the embedded secure data will generally last for the lifetime of the IC. Embedded secure data written by a charged particle beam tool 100 into the electronically functional interconnect structure of the chip is also generally functionally stable, i.e., not subject to change with temperature or time.

Some exemplary applications for embedded secure data written onto ICs as unique or random codes are listed below.

In some embodiments, embedded secure data can be used to provide identifiers (IDs) for individual chips. Embedded chip identity can be used to defend against counterfeiting and enable supply chain traceability from wafer (pre-fabrication) to end of life (EOL) for the packaged, sold and installed chip. Chip ID values can comprise information specifying, for example, the chip's manufacturer, production location, fab-lot, wafer number, die location and/or sequential code.

In some embodiments, embedded secure data can be used to encode a communications address in hardware. An IC-embedded communications address for network communication is truly non-volatile and can be uniquely associated with a single IC. With IPv6 every IC produced can have one or more unique IP addresses physically encoded. These communications addresses can be, for example, written to specification provided prior to or at the time of fabrication, or serial (or random) within an allotted range. A MAC (media access control) address can also be written to a chip to give it a unique communication address.

In some embodiments, embedded secure data can be used to provide encryption keys. "Private key" (asymmetric) encryption ensures secure authentication and/or authorization and is typically considered an effective defense against malicious (or otherwise unauthorized) access to data or other system resources. More than one key, or public and private key pair, can be added to each IC to, for instance, individually protect communications ports or allow for different levels of authorization to various parts of the IC. The public keys can be written such that they are accessible on a communications bus, while the private keys can be written in various locations in an IC electrically separated from any communication bus but useable for encryption/decryption.

Public/private key pairs can also be written for use with respect to decoding data or instructions where decoded plaintext is to be transmitted out of the chip. This can be used to avoid some of the vulnerabilities of private keys stored and accessed (potentially without authorization) by software.

In some embodiments, embedded secure data can be used to embed unique, unpredictable data within an encryption engine to comprise and/or be used to generate one or more keys for symmetric encryption or public and private key pairs for asymmetric encryption. The data can be written in various locations in an IC and isolated from any communication bus but useable by an encryption engine to generate keys or key pairs.

For example, a chip ID can be embedded with a private key. Correct decryption of the chip ID using the publicly known public key can be used to verify authenticity of the chip, particularly if no person has ever had access to the private key.

In some embodiments, embedded secure data can comprise unique, unpredictable data embedded within a random number generator for use in generating random numbers. The data can be isolated from any communication bus but useable by, for example, an encryption engine to generate keys or key pairs.

Accurate writing of embedded secure data can be verified during a test cycle following fabrication, regardless of whether the secure data can be directly accessed through communications channels (input/output and/or an on-chip bus), or is hidden from direct (and/or indirect) external access or internal cross-functional-unit access. For example, a chip ID or an IP address can be read during chip final test, and results can be part of production records. A private key can be verified during test by encrypting a message or instruction(s) with the public keys and letting the embedded encryption engine decode it. Good (test-passing) and trustworthy chips can be documented in a vendor database which customers can query to confirm an IC's legitimacy (e.g., source, or design specifications for the corresponding production run). The impact on test cost and time is negligible.

A charged particle beam system 100 can be used to write embedded secure data to provide hardware-embedded device-level security expressed in interconnects to complement software security, enhance cyber defense, and strengthen the chain of trust in the silicon-to-chip manufacturing process.

Figure 2:
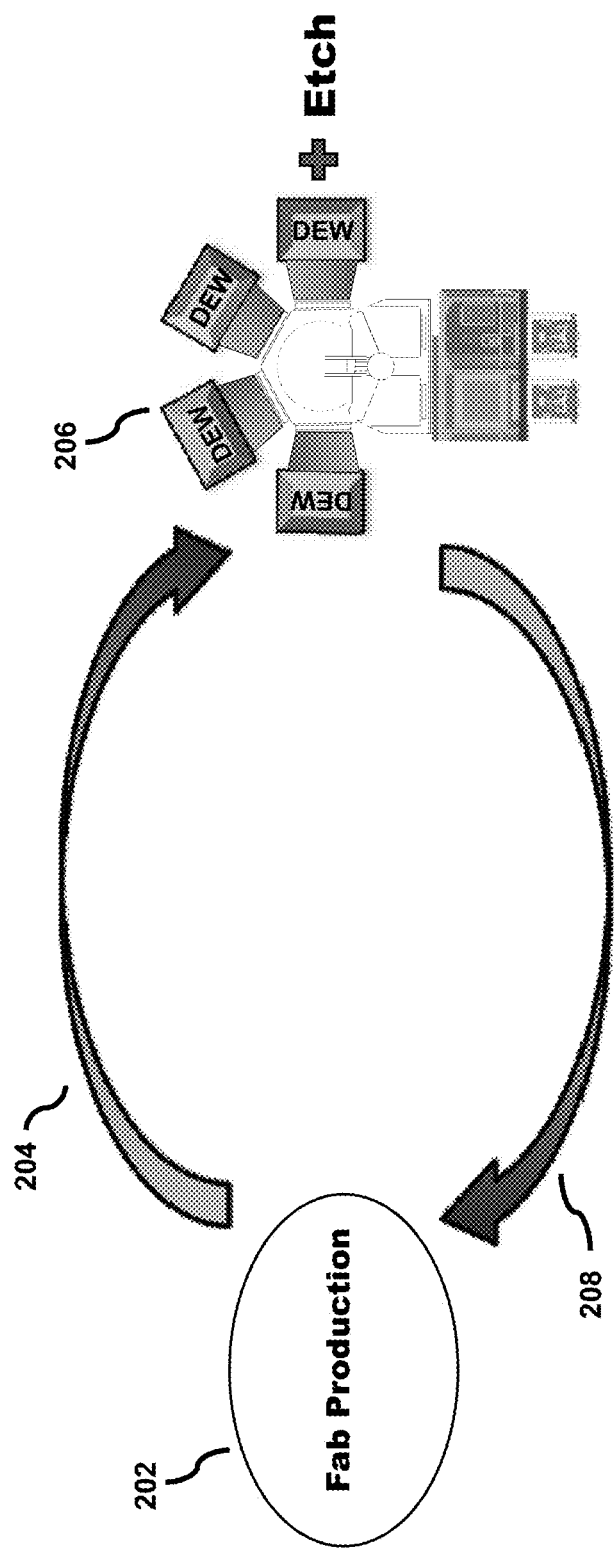
FIG. 2 schematically shows an example of an IC fabrication process using charged particle beams to write embedded secure data.

FIG. 2 schematically shows an example of an IC fabrication process using charged particle beams to write embedded secure data. An IC fabrication process (e.g., a conventional process) can be modified to include chip personalization by addition of embedded secure data in between (or before or after) other IC fabrication steps. That is, chip personalization can occur during IC fab (fabrication)—in between IC fab steps—and need not replace or disrupt typical IC fab steps. For example, during IC fabrication processes 202—such as while the wafer is being processed at a Via-x layer—the wafer can be transferred 204 to the charged particle beam system 100 at step 206 to perform charged particle beam work (plus etch) to add embedded secure data, and then returned 208 to normal process flow to complete IC fabrication 202.

To insert and embed embedded secure data in a Via-x layer, it is generally sufficient for the charged particle beam system 100 to be given the chip-specific values 118 (specifically, or as an algorithm to generate data values), the relevant portion of the design layout specifying potential write locations for corresponding data values 114, and a wafer map with locations for each chip on the wafer 116. This is generally unchanged by whether the process node is mature or leading-edge; or whether the layout style is 2D, or 1D "lines-and-cuts".

In some embodiments, when one or more wafers will be processed with the same potential write locations within each chip and substantially fixed positions for each chip on a wafer, a single file combining design layout and wafer map can be used by the data-prep system.

The insertion of secure data generally does not significantly impact overall IC design. It is sufficient for the designer to allocate space (such as the Register(s) in FIG. 7, which can typically be fit into a small enough chip area not to significantly impact design) in which to write the secure data. Each Register can consist of one or more standard cells designed to facilitate charged particle beam embedding of data.

Figure 3:
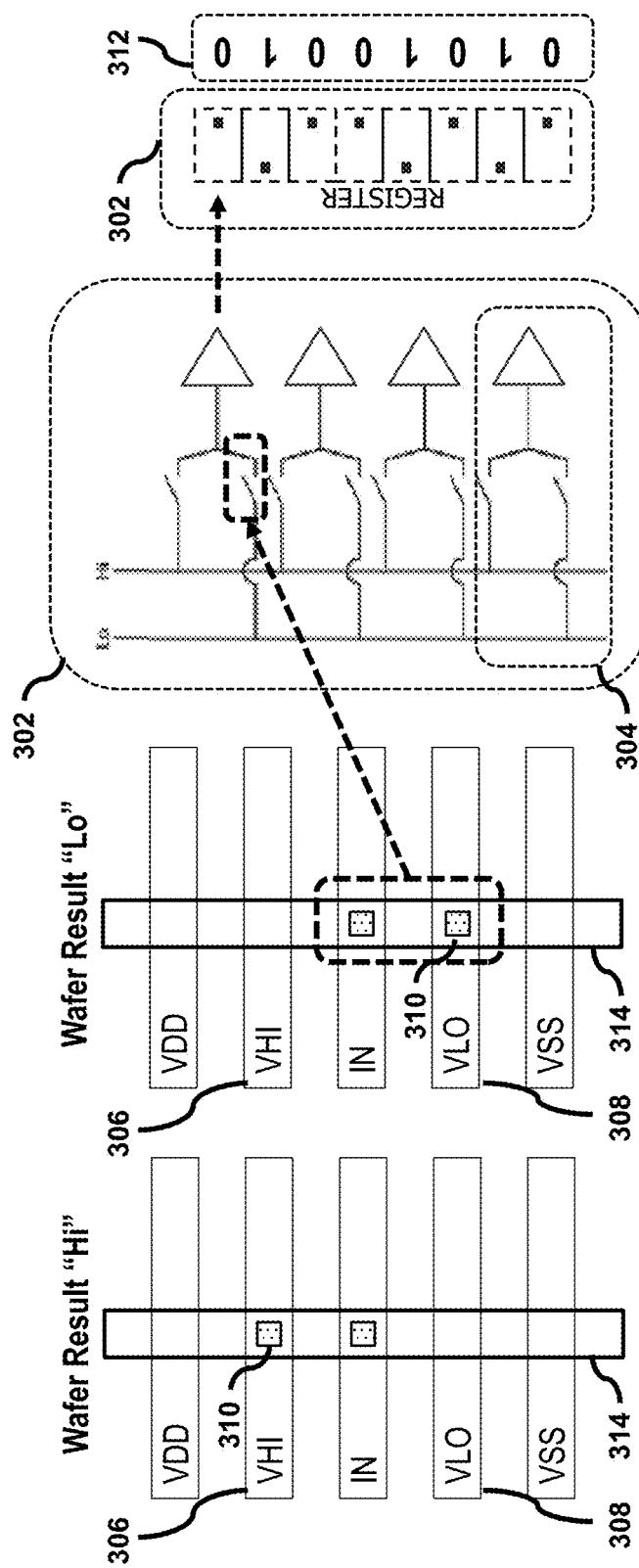
FIG. 3 schematically shows an example of a design layout implementing embedded secure data.

FIG. 3 schematically shows an example of a design layout implementing embedded secure data. Preferably, most features in an IC comprising embedded secure data correspond to a fixed design layout, with locations for vias (or cuts or holes) being specified according to the values to be written for chip-specific data.

In the same manner as the input to an inverter can be programmed by a hole or cut pattern, multiple inputs to more complex circuits can also be programmed. FIG. 3 shows a register 302 made up of buffers 304 that are connected to either $V_{HI}$ 306 or $V_{LO}$ 308 by a charged particle beam writing corresponding vias 310. Data values to be written can be determined by, for example, a data file, an algorithm, or a random number generator, with write locations determined based on the design layout database. Binary "0" or "1" values for particular bits (the embedded secure data as written 312) correspond to vias written to connect particular data lines 314 to $V_{HI}$ 306 or $V_{LO}$ 308.

Registers can have various widths, e.g., 16-bit, 32-bit, 64-bit or 128-bit. Buffer 302 outputs can be made accessible by, for example, a CPU, encryption engine, random number generator 806, or other logic or memory block allowing use of the data 314 for specific and limited functions, or various operations. One example would be to read the register and send the data off-chip for use external to the IC.

Table 1 shows an example of how a chip ID can be stored in a 64 bit register.

TABLE 1

|    | Q63-Q24 | Q23-Q16  | Q15-Q0 |
| -- | ------- | -------- | ------ |
| ID | Lot #   | Wafer #  | Die #  |

Table 2 shows an example of how private and public encryption keys can be stored in a 2048 bit register. For larger numbers of bits, a via-ROM may be preferred to a register.

TABLE 2

|     | Q2047-Q1024 | Q1023-Q0 |
| --- | ----------- | -------- |
| Key | Private     | Public   |

Table 3 shows how a communications address such as IPV6 (Internet Protocol version 6) or MAC (Media Access Control) could be stored in registers.

TABLE 3

|                       | Q127-Q0 | Q47-Q0 |
| --------------------- | ------- | ------ |
| Communication address | IPV6    | MAC    |

In some embodiments, embedded secure data to be written can be specified and provided to the charged particle beam system 100. In some such embodiments, an IC designer designates locations for chip-specific data, with potential write locations corresponding to potential bit values, within each IC. The designer provides files with chip-specific data to be written in each IC. The charged particle beam system inserts chip-specific data by patterning "holes" in designated locations in the metallization structure on the wafer.

In some embodiments, embedded secure data to be written can be determined by a specified algorithm. In some such embodiments, an IC designer designates locations for chip-specific data, with potential write locations corresponding to potential bit values, within each IC. The designer (or other person, e.g., a customer) provides algorithms that generate chip-specific data to be written in each IC. The charged particle beam system inserts chip-specific data by using algorithms to determine chip-specific data to be patterned, and then patterning "cuts" or "holes" in designated locations in the metallization structure on the wafer.

In some embodiments, embedded secure data to be written can be randomly generated. In some such embodiments, an IC designer designates locations for random writing of chip-specific data, with potential write locations corresponding to potential bit values, within each IC. The charged particle beam system inserts chip-specific data by randomly generating data to be patterned, and then patterning "holes" in designated locations in the metallization structure on the wafer.

Figure 4B:
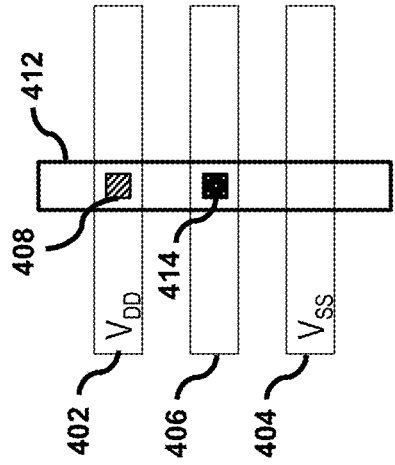
FIG. 4B schematically shows an example of a design enabling selection of chip-specific information at the writing stage.
Figure 4D:
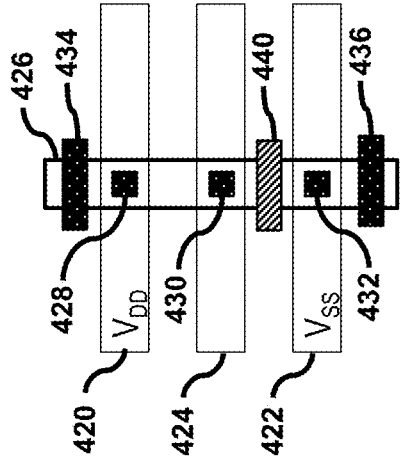
FIG. 4D schematically shows an example of a design enabling selection of chip-specific information at the writing stage.
Figure 4A:
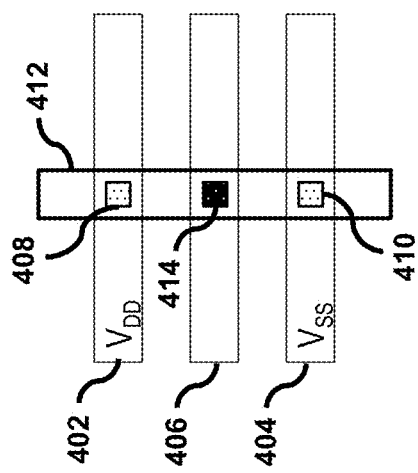
FIG. 4A schematically shows an example of a design enabling selection of chip-specific information at the writing stage.

FIG. 4A schematically shows an example of a design enabling selection of chip-specific information at the writing stage. It is typical in CMOS logic to have "0" set to the $V_{SS}$ voltage level, and "1" set to the $V_{DD}$ voltage. (In some embodiments, the reverse is true; and some embodiments can use multi-value logic.)

Figure 5:
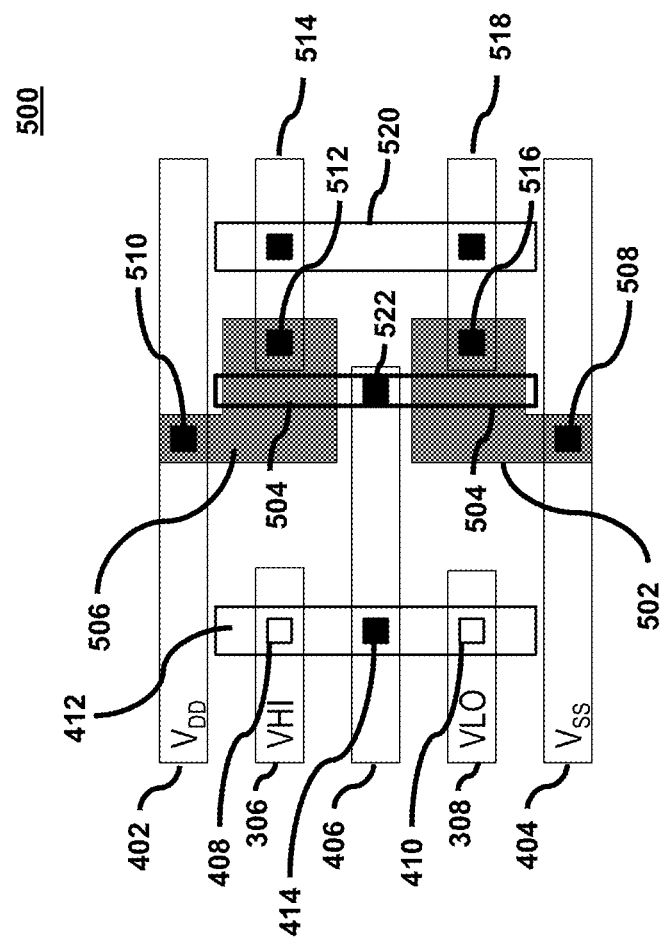
FIG. 5 schematically shows an example of an inverter layout implementing embedded secure data.

In embodiments as shown in FIG. 4A, interconnect line 402 connects to power rail $V_{DD}$ and interconnect line 404 connects to power rail $V_{SS}$. Line 406 is an interconnect that will be connected to either $V_{DD}$, using a via fabricated using a hole written at 408, OR (not and—this is an exclusive or) $V_{SS}$, using a via fabricated using a hole written at 410. Line 406 continues past the circuit portion shown in FIG. 4A, and at least partially determines output data for a corresponding memory circuit. A via fabricated at location 408 will result in an inverter buffer (as illustrated in FIG. 5) containing the circuit of FIG. 3 outputting a logical "0" (inverted "1"), while a via fabricated at location 410 will result in the inverter buffer outputting a logical "1" (inverted "0").

Line 412 spans lines 402, 404 and 406. In a typical IC, lines 402, 404, and 406 would be implemented in the Metal-1 layer, while line 412 would be implemented in Metal-2 running perpendicular to Metal-1 and one layer higher in the interconnect stack. Hole 414 represents a "hole" layer, for example Via-1, which connects Metal-1 and Metal-2 features; here, a via fabricated using hole 414 will use line 412 to connect line 406 to either line 402 ($V_{DD}$, if a hole is written at location 408) or line 404 ($V_{SS}$, if a hole is written at location 410). Locations 408 and 410 represent potential hole locations; which of the potential hole locations 408 and 410 is written with a hole determines the corresponding logical bit value ("0" or "1") outputted by a memory circuit containing the structure illustrated in FIG. 4A.

FIG. 4B schematically shows an example of a design enabling selection of chip-specific information at the writing stage. In particular, FIG. 4B shows the interconnect structure after Metal-2 processing according to the design of FIG. 4A. As shown, after Metal-2 processing, lines 402, 404 and 406 are physical lines fabricated in the Metal-1 layer and line 412 is a physical line fabricated in the Metal-2 layer. A via is fabricated at hole 414 in the Via-1 layer and connects Metal-1 line 706 to Metal-2 line 412. A hole is written and a via is fabricated at potential hole location 408 (based on some selection criteria, e.g., random, sequential, algorithmic or pre-selected, as discussed with respect to FIG. 3) to connect line 402 ($V_{DD}$) across line 412, through the via fabricated at hole 414, to line 406. Line 406 is thereby connected to $V_{DD}$ and carries $V_{DD}$ further through a corresponding memory circuit (e.g., a buffer 304 corresponding to a single bit) to influence a resulting output data value of that memory circuit.

Figure 4C:
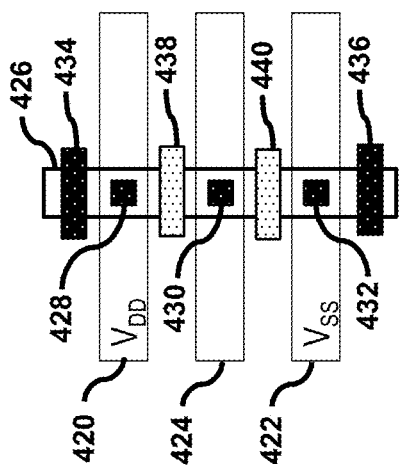
FIG. 4C schematically shows an example of a design enabling selection of chip-specific information at the writing stage.

FIG. 4C schematically shows an example of a design enabling selection of chip-specific information at the writing stage. In embodiments as shown in FIG. 4C, interconnect line 420 connects to power rail $V_{DD}$ and interconnect line 422 connects to power rail $V_{SS}$. Line 424 is an interconnect that will be connected to either $V_{DD}$ (line 420) OR (not AND—this is an exclusive or) $V_{SS}$ (line 422).

Line 426 spans lines 420, 422 and 424. In a typical IC, lines c-420, 422 and 424 would be implemented in the metal-1 layer, while line 426 would be implemented in Metal-2 running perpendicular to Metal-1 and one layer higher in the interconnect stack. Holes 428, 430, and 432 represent a "hole" layer, for example Via-1, which connects Metal-1 and Metal-2 features. "Cut" locations 434 and 436 are fixed design, and separate the portion of line 426 used to connect lines 420, 422 and 424 from portions of line 426 used by other circuits on the die.

Features 438 and 440 are potential cut locations. Preferably, during wafer fabrication using a charged particle beam system 100, a cut will be written at only one of potential cut locations 438 and 440. Line 424 will be cut off either from $V_{DD}$ using a cut at potential cut location 438 or cut off from $V_{SS}$ using a cut at potential cut location 440. The cut at potential cut location 438 or 440 effects the exclusive-or connection of line 424 to one of $V_{DD}$ or $V_{SS}$.

FIG. 4D schematically shows an example of a design enabling selection of chip-specific information at the writing stage. In particular, FIG. 4D shows the interconnect structure after Metal-2 processing according to the design of FIG. 4C. As shown, after Metal-2 processing, lines 420, 422 and 424 are physical lines fabricated in the Metal-1 layer and line 426 is a physical line fabricated in the Metal-2 layer. A via is fabricated at hole 430 in the Via-1 layer and connects Metal-1 line 424 to Metal-2 line 426. Holes written and vias fabricated at 428, 430 and 432 are fabricated in the via-1 layer and connect metal-1 lines to metal-2 lines. Cut 440 is written and fabricated (based on some selection criteria, e.g., random, sequential, algorithmic or pre-selected, as discussed with respect to FIG. 3) to allow Metal-2 line 426 to connect Metal-1 lines 420 and 424, while splitting Metal-2 line 426 to prevent connection between Metal-1 lines 420 and 424.

Design principles illustrated in FIGS. 4A, 4B, 4C and 4D can be applied to a CMOS circuit as shown in FIG. 5 to fabricate embedded secure data. The circuit as shown in FIG. 5 performs a logical inverter function, in which the logical state of the output is the Boolean inverse of the logical state of the input. In other words, a "0" at the input produces a "1" at the output and vice-versa.

FIG. 5 schematically shows an example of an inverter layout implementing embedded secure data 500. The inverter layout in FIG. 5 can be used to implement a buffer 304 as shown in FIG. 3. As illustrated in FIG. 5, a single cut feature (a "hole" used to make a via) is sufficient to write a bit. By limiting the amount of writing to be performed by a charged particle beam tool 104 to a relatively small total surface area requiring irradiation, embedded secure data can be fabricated quickly enough to support commercial-level throughput.

The circuit in FIG. 5 performs a logical inverter function, in which the logical state of the output is the Boolean inverse of the logical state of the input. In other words, a "0" at the input produces a "1" at the output and vice-versa.

In embodiments as shown in FIG. 5, interconnect line 402 connects to power rail $V_{DD}$ and interconnect line 404 connects to power rail $V_{SS}$. An NMOS transistor is formed by the intersection of diffusion layer region 502 and gate electrode layer region 504. A PMOS transistor is formed by the intersection of diffusion layer region 506 and gate electrode layer region 504. The source of the NMOS transistor is connected to $V_{SS}$ through contact hole 508. The source of the PMOS transistor is connected to $V_{DD}$ through contact hole 510. The drains of the NMOS and PMOS transistors are connected together by contact holes 512 (and Metal-1 line 514) and 516 (and Metal-1 line 518) and Metal-2 line 520. Line 520 is the output of the inverter circuit 500.

The input of the inverter circuit is the gate electrode 504 connected to Metal-1 line 406 through contact hole 522. Line 406 is connected to Metal-2 line 412 by Via-1 hole 414.

Line 412 can be connected to either line $V_{HI}$ 306 by tagged (potential) Via-1 hole 408, or (not and—this is an exclusive or) to line $V_{LO}$ 308 by tagged (potential) Via-1 hole 410.

Here, $V_{HI}$ 306 and $V_{DD}$ 402 are set to logical "1", and $V_{LO}$ 308 and $V_{SS}$ 404 are set to logical "0".

Writing hole 408 results in inverter input gate electrode 504 being connected to $V_{HI}$ 306, resulting in the source and drain of the NMOS transistor being connected, connecting line 520 (output) to $V_{SS}$ 404. Consequently, setting the input to logical "1" ($V_{HI}$ 306) will cause the inverter to output logical "0" ($V_{SS}$ 404).

Writing hole 410 results in inverter input gate electrode 504 being connected to $V_{LO}$ 308, resulting in the source and drain of the PMOS transistor being connected, connecting line 520 (output) to $V_{DD}$ 402. Consequently, setting the input to logical "0" ($V_{LO}$ 308) will cause the inverter to output logical "1" ($V_{DD}$ 402).

Circuit design layout for a logical inverter as shown in FIG. 5 can be predominantly fixed prior to determination of values to write as embedded secure data. Preferably, the portion of the design implementing secure embedded data that changes from IC to IC is limited to the selectable vias 408 and 410, pairs of which comprise the binary-choice potential write locations corresponding to potential embedded secure data bit values ("0" or "1").

Figure 6A:
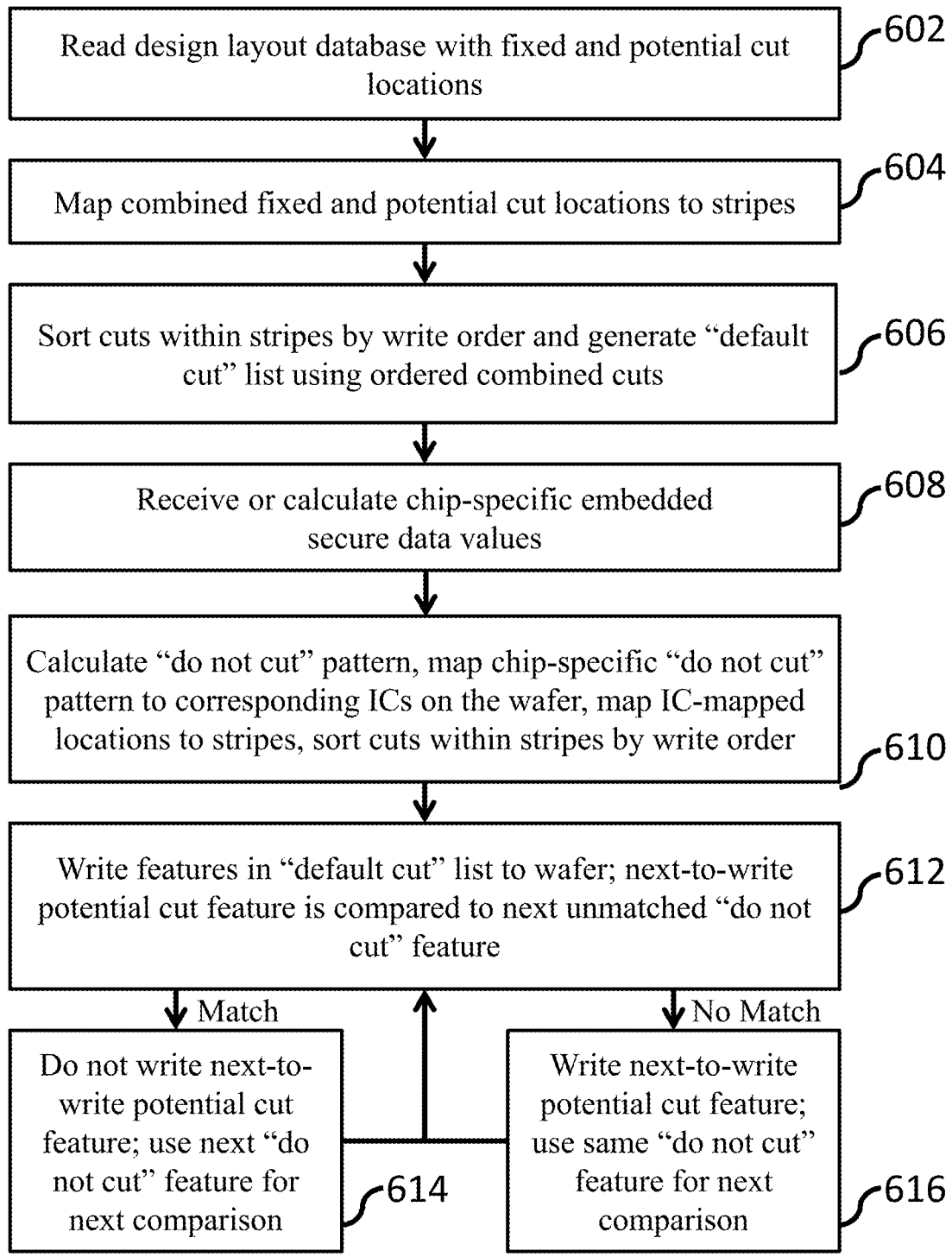
FIG. 6A shows an example process for writing non-volatile data into interconnects in an IC.

FIG. 6A shows an example process for writing chip-specific non-volatile data into interconnects in an IC. Cuts and/or holes ("cut features") can be selectively written using a charged particle beam tool 104 to instantiate embedded secure data in interconnects.

As shown, a design file (a design layout database) containing the locations of fixed and potential cut features to be written is read from storage 602. Fixed and potential cut feature locations are mapped to stripes (in writing areas of corresponding columns if using a multiple beam column writer) 604, and are then sorted into the order in which they will be written 606. For example, cut features can be sorted first by row, then by lateral location within corresponding rows. The output of step 606 is one or more ordered lists (preferably per column, if using a multiple beam column writer) of "default cut" features (locations) which will be used by the writer to control writing (cut lists are also referred to as cut patterns herein). (Stripe writing is disclosed in, for example, U.S. patent application Ser. No. 14/522,563, which is incorporated herein by reference.)

Chip-specific information to be written as embedded secure data values (one or more binary numbers) can be received or algorithmically calculated 608. Chip-specific information can be, for example, an identification code based on lot, wafer or die, or it could be a public or private encryption key, or a value used to improve random number generation.

Using the chip-specific information to be written and the design layout database, chip-specific "do not cut" features for corresponding ICs are mapped to locations on the substrate corresponding to the locations of said ICs, and the IC-mapped locations are mapped to stripes (in writing areas of corresponding columns if using a multiple beam column writer) and sorted into a write order 610. Step 610 outputs one or more ordered lists (preferably per column, if using a multiple beam column writer) of "do not cut" features (locations) which will be used by the writer to control writing. The "do not cut" features can be sorted in the same manner as the "default cut" features (see step 606). "Do not cut" features are those potential locations to which the charged particle beam(s) will NOT write cut features to embody the chip-specific information in interconnects on the wafer.

The wafer is then (stripe) written 612, during which the desired (fixed and chip-specific) pattern is written to the substrate. Cut features are written or not in dependence on the "default cut" and "do not cut" ordered lists generated in steps 606 and 610. As the charged particle beam tool 104 is ready to write a potential cut feature from the list generated in step 606, the location of the potential cut feature is compared to the first unmatched location in the corresponding "do not cut" list generated in step 610. If the locations match, then that potential cut feature is skipped and not written 614 (and the next "do not cut" list entry is used in the next comparison); if the locations do not match, that cut feature is written 616 (and the same "do not cut" list entry is used in the next comparison). This comparison is preferably done for each potential cut feature in the "default cut" list.

As will be apparent to one of ordinary skill in the art of charged particle beam substrate writing, the process of FIG. 6A can alternatively be performed using a set of ordered "do cut" feature lists comprising both fixed-design cut features and those of the potential cut features that are calculated (using the values and the design file) to be written to embody the received or generated values (see step 608) in interconnects on the substrate. Steps 602 through 606 can be delayed until after step 608, and ordered list generation (including calculating and mapping locations, and sorting the results into ordered lists) can be performed on a combination of the fixed and potential cut features.

Use of "do cut" feature lists may be preferable in some embodiments, e.g., in which a single substrate (or small number of substrates) is being written.

Use of "default cut" and "do not cut" feature lists may be preferable in some embodiments, e.g., in which multiple substrates are being written. In such embodiments, the "default cut" feature lists can be constructed once prior to writing a run of multiple substrates, with the "do not cut" feature lists being constructed prior to writing of corresponding individual substrates. Also, separation of "default cut" and "do not cut" feature lists advantageously isolates chip-specific location information from fixed design information.

The methods disclosed herein for writing chip-specific information advantageously enable separation of domains of information in the design-to-chip process. In other words, while the IC design group specifies where cuts or hole are possible, and tags locations that can be programmed (possible write locations corresponding to possible embedded secure data values), the design group can be restricted or prevented from access to information such as chip ID numbers, encryption keys or communications addresses as written, and from access to algorithms for generating such values. The methods disclosed herein also advantageously allow sensitive information such as private encryption keys to be calculated and used (with respect to the design-to-chip process) within the writer while preventing user access (by authorized or unauthorized users) to the sensitive information (including by software hack or by spear phishing or other social engineering hack).

Figure 6B:
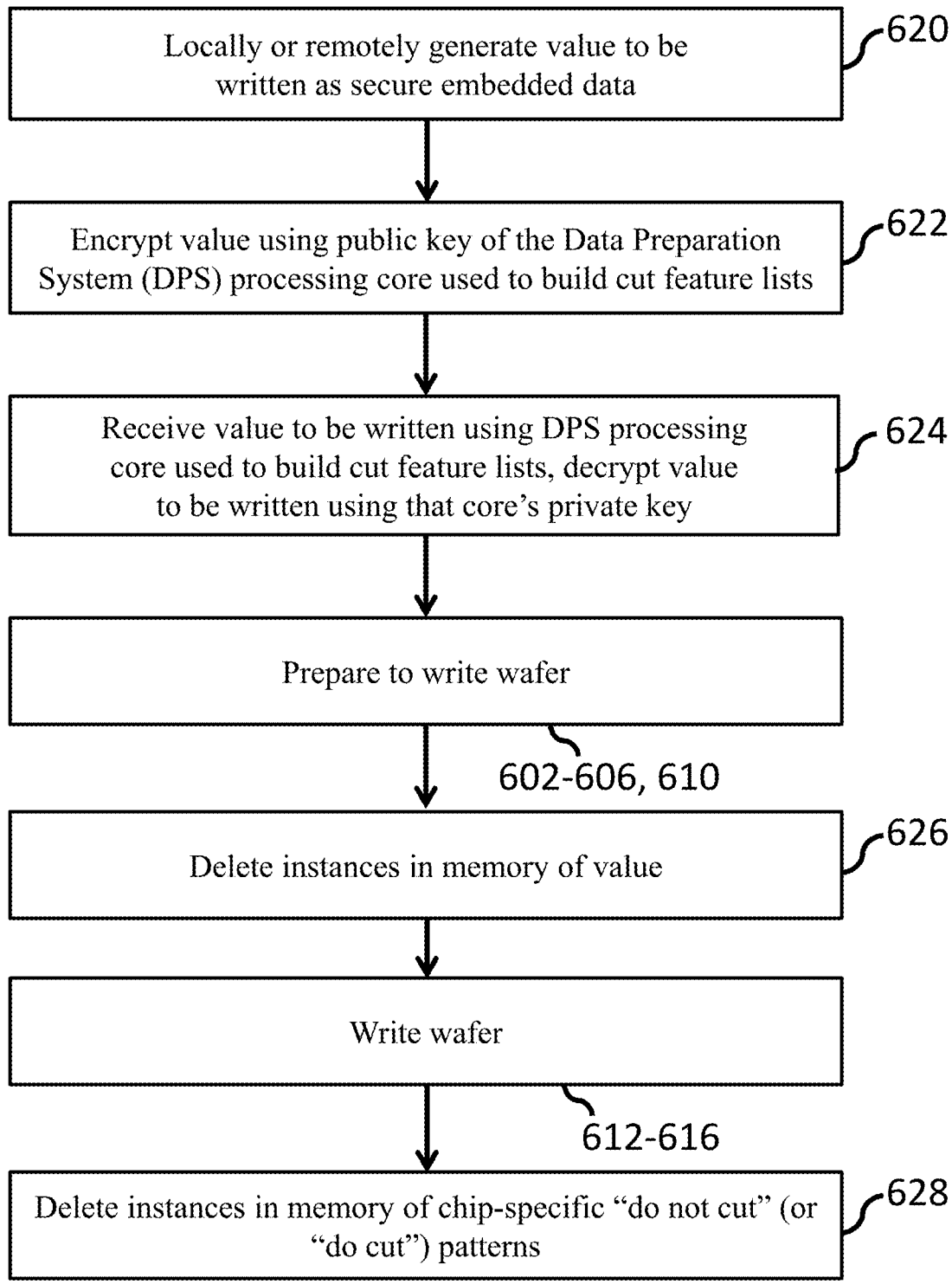
FIG. 6B shows an example process for securely writing non-volatile data into interconnects in an IC.

FIG. 6B shows an example process for writing non-volatile data into interconnects in an IC while preventing human access to written values. As shown, a value to be written as secure embedded data is generated 620, and is encrypted (preferably immediately, to prevent external access) by the generating processing core using a public key corresponding to a private key (preferably in secure embedded data) of the processing core that will be used to build cut/hole lists 622. The encrypted value can be further encrypted using a private key (preferably in secure embedded data) of the generating processing core to authenticate the source of the value. The processing core that will be used to build cut/hole lists receives and decrypts the value 624 (using its private key and, if applicable, the public key of the generating processing core), and a write process is performed using steps 602-606 and 610-616 to write the value to the substrate as secure embedded data (steps 602-606 can be performed before, during or after steps 620-624).

Generation and encryption of values to be written as secure embedded data do not need to happen in the "fab" (substrate device fabrication plant); they can be performed anywhere, and a file containing the encrypted values can be sent to the fab for writing. Preferably, the device used to generate values to be written as secure embedded data is itself trusted (in a security sense).

Instances in memory of the value and of the chip-specific "do cut" or "do not cut" pattern are preferably encrypted when not actively in use to write the substrate. Decrypted and encrypted instances in memory of the value are deleted after the value is used to generate chip-specific "do not cut" (or "do cut") patterns to be written to the substrate as secure embedded data 626. The chip-specific "do cut" or "do not cut" patterns are deleted after being written to the substrate as secure embedded data 628.

In some embodiments, non-encrypted instances in memory of values to be written as secure embedded data are deleted immediately after said non-encrypted values are used to calculate corresponding potential write locations, e.g., "do cut" or "do not cut" lists (i.e., immediately after step 610).

Figure 7:
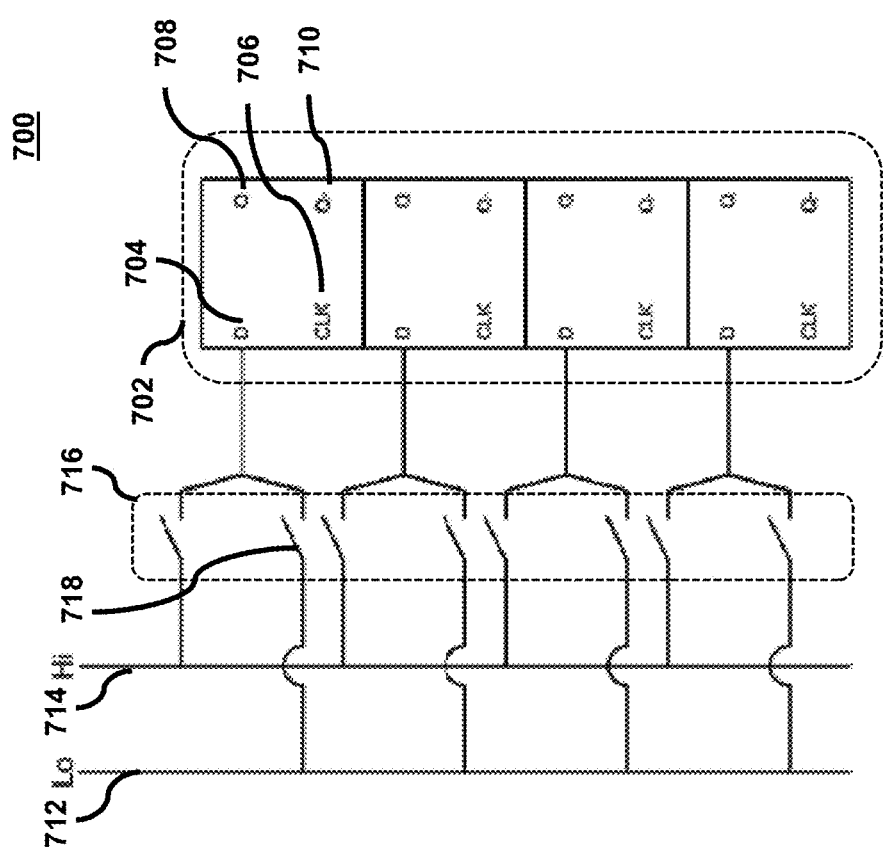
FIG. 7 schematically shows an example of a system-on-a-chip (SoC) design with register locations for embedded secure data insertion.

FIG. 7 schematically shows an example of a register 700. Multiple inputs to complex circuits can be programmed using a hole or cut pattern in similar fashion to programming of an input to an inverter (see FIG. 5). FIG. 7 shows a 4-bit register 700 made up of 4 "D" flip flops 702. Such registers are widely used in digital logic circuits. An input "D" 704 is latched on the rising edge of the clock input CLK 706; whatever logic state was latched appears at the output "Q" 708 after some internal delay. "Q-" 710 is the inverse of "Q".

The logic states of "0" and "1" are available on the interconnect lines 712 and 714, respectively. Either line (line 712 or line 714) can be connected to inputs to the registers 704. For example, an input 704 to a register 702 can be programmed to a "0" by programming the connection in a switch 716 (as shown, switch 718) using a hole or cut. In a similar manner, other register inputs 704 can be programmed to either logic state ("0" or "1") using the switches 716.

Inputs are preferably each programmed to one of the available logic states to ensure predictable functionality.

Figure 8:
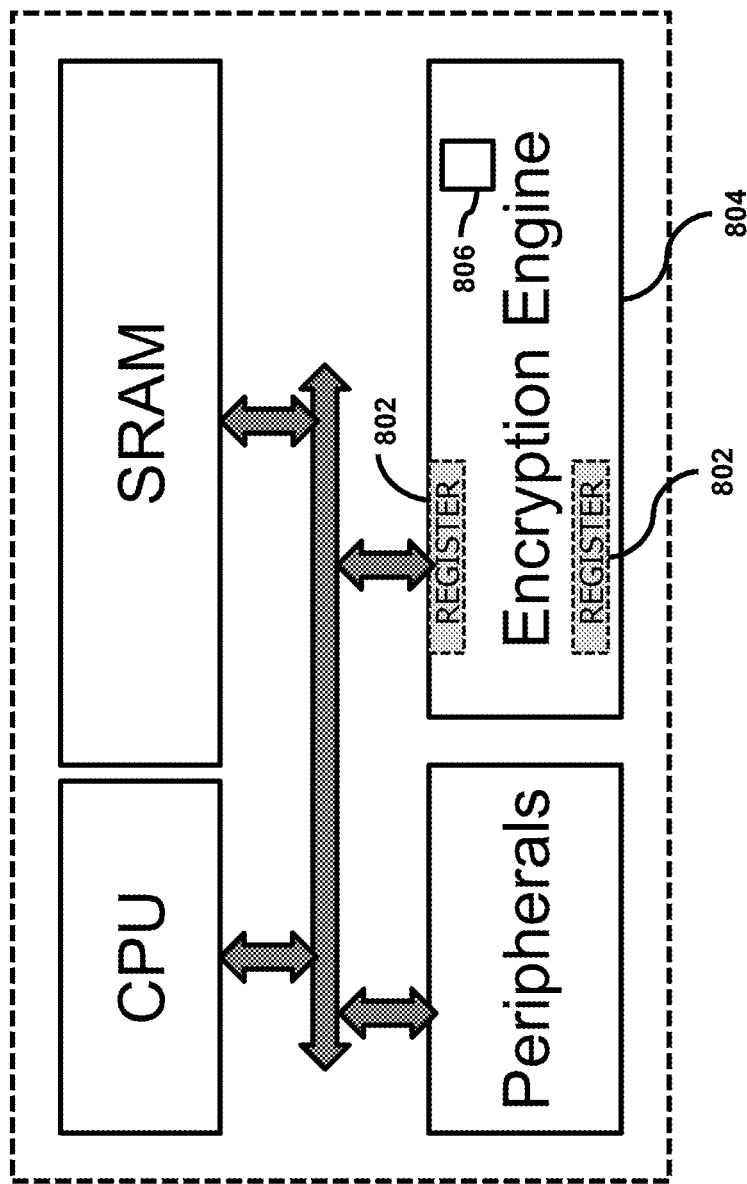
FIG. 8 schematically shows an example of a register.

FIG. 8 schematically shows an example of a system-on-a-chip (SoC) design with register locations for embedded secure data insertion. An SoC design can comprise locations for insertion of embedded secure data during production in the wafer fab.

As shown in FIG. 8, registers 802 containing embedded secure data can be contained within a purpose-designed functional unit. In the embodiment(s) shown, an encryption unit 804 contains and limits (or prevents) access to the registers 802 containing embedded secure data.

Figure 9:
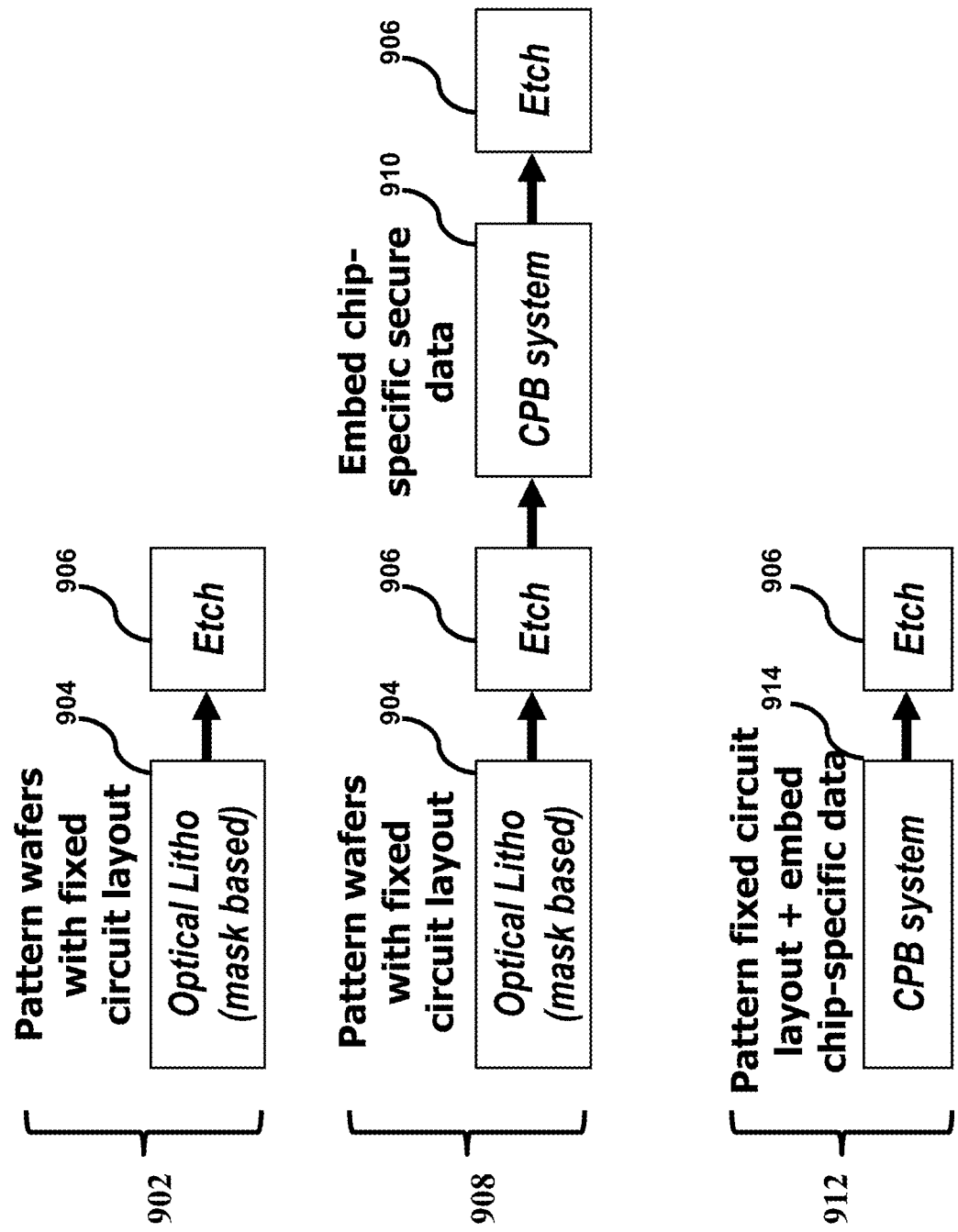
FIG. 9 shows an example comparison of optical, CPB and hybrid lithography process flows.

FIG. 9 shows an example comparison of optical, CPB and hybrid process flows. As shown in FIG. 9, an optical lithography substrate fabrication process 902 typically comprises performing optical lithography using a fixed circuit layout 904 (i.e., using a mask set) and then performing etch 906 to express the optically-exposed pattern. As discussed above, optical-only lithography is not well suited to expressing chip-specific data in interconnects on a substrate. A hybrid optical/CPB process 908, however, can use optical lithography 904 to write a fixed design layout (see step 202); and a CPB system 100, in step 910, to write a chip-specific design layout (see step 206). (Etch steps 906 express exposed and irradiated pattern after respective optical 904 and CPB 910 steps.) A CPB system 100 can also be used to write both fixed and chip-specific design layout 912, with charged particle beam work performed in step 914, followed by etch 906 to express the irradiated pattern.

According to some but not necessarily all embodiments, there is provided: A method of writing a substrate using a charged particle beam tool, comprising the actions of: writing multiple cut features to multiple dies on a substrate using one or more charged particle beams, different features being written to different dies, values permanently stored in said dies being at least partially determined by the locations of said cut features, said locations being determined by the charged particle beam tool in dependence on said values; and preventing and restricting access to and transmission of said values and said locations from the tool, wherein said preventing and restricting persist before, during and after said writing, and wherein said preventing applies to unencrypted instances of said values and said locations and said restricting applies to encrypted instances of said values and said locations.

According to some but not necessarily all embodiments, there is provided: A method of writing a substrate using a charged particle beam tool, comprising the actions of: generating a unique or random value to be written to a substrate using a value-generating integrated circuit (IC); encrypting said value with a public key using said value-generating IC, said value not having been transmitted out of said value-generating IC prior to said encrypting; decrypting said encrypted value with a private key corresponding to said public key using a writing-preparation IC; calculating locations on the substrate to write to embody said value in interconnects on the substrate as electronically readable data, said data not accessible to any external input/output port of a corresponding IC, in at least partial dependence on said decrypted value and the design layout database of the substrate; writing cut features on the substrate in at least partial dependence on said calculated locations using one or more charged particle beams; and making said value and said locations permanently inaccessible following said writing.

According to some but not necessarily all embodiments, there is provided: A method of writing a substrate using a charged particle beam tool, comprising the actions of: generating one or more integrated circuit-specific (IC-specific) values to be written in interconnects on the substrate; calculating a list of default-write locations comprising the fixed write locations and the potential write locations specified by a design layout database of the substrate, wherein said potential write locations comprise the possible substrate locations that can be written to embody an arbitrary IC-specific value in interconnects; calculating a list of do-not-cut locations in dependence on said design layout database, said do-not-cut list comprising those of said potential write locations NOT to be written to embody said values in said interconnects; writing cut features to the substrate using one or more charged particle beams, wherein said beams write cut features to locations specified in said default-write list EXCEPT for locations specified in said do-not-cut list.

According to some but not necessarily all embodiments, there is provided: A method of writing a substrate using multiple charged particle beams, comprising the actions of: writing multiple die-specific interconnect features to multiple dies on the substrate using one or more first charged particle beams, locations of said die-specific interconnect features determining values of non-volatile electronically readable data on said dies, different interconnect features corresponding to different values of said data being written to different ones of said dies; and writing multiple fixed-design interconnect features to said dies using one or more second charged particle beams, locations of said fixed-design interconnect features being specified by a design layout database of the substrate to be the same among said dies; wherein said die-specific writing and said fixed-design writing are performed independently and simultaneously by said first and second beams.

According to some but not necessarily all embodiments, there is provided: Methods, systems and devices for using charged particle beams (CPBs) to write different die-specific, non-volatile, electronically readable data to different dies on a substrate. CPBs can fully write die-specific data within the chip interconnect structure during the device fabrication process, at high resolution and within a small area, allowing one or multiple usefully-sized values to be securely written to service device functions. CPBs can write die-specific data in areas readable or unreadable through a (or any) communications bus. Die-specific data can be used for, e.g.: encryption keys; communications addresses; manufacturing information (including die identification numbers); random number generator improvements; or single, nested, or compartmentalized security codes. Die-specific data and locations for writing die-specific data can be kept in encrypted form when not being written to the substrate to conditionally or permanently prevent any knowledge of said data and locations.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

In some embodiments, a charged particle beam writing process is used to write both a fixed layout and embedded secure data.

In some embodiments, embedded secure data is applied to other applications than those described herein.

In some embodiments, other charged particle beam wafer-writing tools than those described above can be used to write embedded secure data.

In some embodiments, more or fewer than two potential alternative write locations are used to designate the value of an output bit.

In some embodiments, the value of more than one output bit is designated by a single potential write location, multiple alternative write locations, or one or multiple groups of multiple potential write locations.

Those of ordinary skill in the art of charged particle beam IC fabrication will understand that other techniques and tools than those recited herein for charged particle beam writing can be used.

In some embodiments, particular numbers or types of charged particle beam columns are disclosed. As will be apparent to one of ordinary skill in the art of charged particle beam IC fabrication, one or more columns can be used, and columns can project electron or ion beams, to perform the above-described semiconductor manufacturing processes.

In some embodiments, embedded secure data can be used by function units on-chip, or in functional units external to the chip.

In some embodiments, different data values are inserted into some or each of the different ICs in a patterned wafer and/or in some or each of the different patterned wafers in a production run or across all production runs.

In some embodiments, individual embedded secure data values can be used for one or multiple purposes. In some embodiments, individual embedded secure data values can express one or multiple sets of information (e.g., an embedded secure data value can be a single number formed by multiple numbers multiplied by or otherwise convolved with each other).

In some embodiments, "Q" outputs can be made accessible to a CPU, allowing a program to handle the embedded secure data during chip operation. For example, a register containing the "Q" outputs can be read, and the data can be sent off-chip for use elsewhere in a system containing the chip.

In some embodiments, chip-specific cuts or holes can be used to change resistor values, capacitance values, or other parameters to personalize, adjust performance, trim electrical parameters, or otherwise modify an IC.

In some embodiments using a secure data path from value generation through writing of secure embedded data, value generation and encryption can be performed by a separate tool and/or a third party (e.g., a customer) if the values to be written are generated by a trusted device not allowing the manufacturer or third party access to unencrypted values. For example, a processing core generating the value(s) to be written can encrypt the encrypted values, immediately following step 624, using a hardware-embedded private key, the public key for which is previously known to the tool that will be used to write the values to a substrate as secure encrypted data. This can act as a guarantee of origin (i.e., from a particular access-resistant value generator).

In some embodiments, the algorithm used to generate values to be written as secure embedded data remains encrypted when not in use generating values.

In some embodiments, the decision to write (or not write) a cut can be made by a random number generator during writing, immediately before writing (or not writing) said cut.

In some embodiments, the sorted "do not cut" list created in step 610 is encrypted using hardware-embedded encryption immediately after creation, and decrypted using hardware-embedded decryption immediately prior to use in writing the values to the substrate as secure embedded data.

In some embodiments, long-term solutions for handling inaccessible data can include deletion or permanent storage in encrypted form of data values written and/or of the particular substrate locations written to create secure embedded data.

In some embodiments, deletion and/or encryption of values and/or locations following preparation for writing and/or writing can be performed at different times (e.g., following different steps, or following later fabrication steps, e.g., after-develop or after-etch inspection) than those disclosed hereinabove.

In some embodiments, encrypted instances in memory of the value and of the "do not cut" (or "do cut") list are either deleted or stored in encrypted form after the value is written to the substrate as secure embedded data, such that the corresponding decryption key is inaccessible to all, or to all but a specified entity or list of entities (e.g., the encryption key can be a public key of an entity allowed access).

In some embodiments in which encrypted data values and/or write locations are retained by a first party after writing, the decryption key(s) can be retained by a second party, neither the first nor the second parties nor any affiliated person or entity thereof having the power to require (e.g., order) the encrypted information and decryption key(s) to be united. In such embodiments, release of the key to decrypt the values and/or write locations can be allowed based on previously specified conditions.

In some embodiments, after writing, decryption keys for encrypted values and/or locations can be maintained in escrow by a third party (e.g., with conditional release based on predetermined factors).

In some embodiments using one or more charged particle beam columns to write secure embedded data, local control computers can be used to control the columns as disclosed in U.S. patent application Ser. No. 14/085,768, which is incorporated herein by reference. A "writing area" is defined as the substrate area targetable by a charged particle beam emitted from the column, taking into account stage movement.

In some embodiments, each column is controlled by a different local control computer. In some embodiments in which "writing areas" contain multiple secure embedded data locations from multiple dies, a processor core generating the values to be written in said locations encrypts said values with public keys corresponding to hardware-embedded private keys held by the local control computers controlling the columns with corresponding writing areas.

In some embodiments, communications addresses and/or unique IDs in secure embedded data are encrypted with hardware-embedded private keys to authenticate origin (preventing address or ID spoofing).

In some embodiments, the same chip-specific value can be written to multiple locations on a die as secure embedded data.

In some embodiments, a customer can provide encrypted values to be written as secure embedded data to a third party semiconductor device manufacturer, and use the process described with respect to FIG. 6B (with private keys as described being secure embedded data) to prevent the manufacturer and other third parties from accessing said values.

In some embodiments, access to inspection (imaging) data of substrate locations corresponding to secure embedded data-defining features is prevented during inspection and analysis, and is encrypted and/or deleted after inspection and analysis. In some embodiments, such prevention is effected by fab protocol. In some embodiments, such prevention is effected by the tool generating a "skip areas" file comprising substrate regions containing said locations, said "skip areas" file being used to prevent inspection of, or to prevent reporting of potential defects within, said regions.

In some embodiments, a "skip areas" file would cause an inspection tool to be directed to ignore, skip inspection of, or exclude defects from "skip" areas. In some embodiments, the "skip areas" file can be the same for every wafer, containing every possible location of said cut features. In some embodiments, an electron beam inspection tool would skip inspection of "skip" areas. In some embodiments, an optical tool would be instructed to ignore (or to not report) defects in "skip" areas.

In some embodiments, a "skip areas" file can be encrypted with a public key for which only authorized inspection tools possess a corresponding private key. In some such embodiments, inspection is restricted or prevented unless the "skip areas" file is decrypted. In some embodiments, the design layout database or a portion thereof (e.g., containing regions in which secure embedded data is written) is encrypted with a public key for which only authorized inspection tools possess a corresponding private key (e.g., the same keys as for the "skip areas" file).

In some embodiments specifying encryption, transmission of data that is described as being encrypted during a process is prevented until such encryption is performed.

In some embodiments, encryption and/or deletion of values and/or locations used to write secure embedded data can be delayed until inspection (e.g., after-develop inspection or after-etch inspection) of such locations is performed (to confirm accurate writing). Inspection performed by the same tool as used to write is disclosed in, for example, U.S. Pat. No. 8,999,627, which is incorporated herein by reference.

In some embodiments, inspection of potential write locations, or of a larger area containing the potential write locations, is prevented (e.g., by fab (wafer fabrication facility) policy, or by encryption of corresponding portions of the design layout database which only designated secure tools can decrypt) for tools other than the charged particle beam tool 100 or other secure tools configured to prevent access to inspection data covering said potential write locations and/or said larger area.

In some embodiments, values to be written as secure embedded data that are encrypted when generated are encrypted with additional information that is known to the tool that will perform decryption (either known specifically, or within a limited set of potential messages), to thereby prevent (hidden) tampering.

In some embodiments, one or more values to be written are encrypted using a public key of the Data Preparation System 102. In some embodiments, one or more values to be written are encrypted using a private key of the system that generated the values.

Particular examples of encryption arrangements are disclosed herein. Those of ordinary skill in the arts of hardware-embedded encryption will understand that alternative encryption arrangements can be used.

In some embodiments, calculation, mapping and sorting as in steps 604 and 606 can be performed separately on fixed cuts and potential cuts—the full list of potential cuts, or only those cuts required to write the received or locally generated value as secure embedded data—and one or more resulting ordered lists can be generated.

In some embodiments, "do not cut" features correspond to the potential locations that a charged particle beam would write to embody the two's-complement(s) of the chip-specific information to be written in interconnects on the wafer.

In some embodiments, private keys are hardware-embedded (e.g., secure embedded data). In some embodiments, encryption and/or decryption are performed in hardware (rather than in software).

In some embodiments in which one or more selected entities have access to decryption keys for encrypted values and/or locations after being written to an IC as secure embedded data, security protocols are maintained by those entities to prevent storage in memory of unencrypted instances of said values and/or locations except as presently required for prompt use of said unencrypted values and/or locations.

Additional general background, which helps to show variations and implementations, may be found in the following publications, all of which are hereby incorporated by reference: U.S. Pat. Nos. 7,316,934; 8,832,465; 9,147,606; 6,355,994; 6,617,587; 6,734,428; 6,738,506; 6,777,675; 6,844,550; 6,872,958; 6,943,351; 6,977,375; 7,122,795; 7,227,142; 7,435,956; 7,456,402; 7,462,848; 7,786,454; 7,928,404; 7,941,237; 8,242,457; 8,384,048; 8,999,627; 8,999,628; 9,184,027; and 9,207,539.

Additional general background, which helps to show variations and implementations, as well as some features which can be implemented synergistically with the inventions claimed below, may be found in the following US patent applications. All of these applications have at least some common ownership, copendency, and inventorship with the present application, and all of them, as well as any material directly or indirectly incorporated within them, are hereby incorporated by reference: U.S. patent application Ser. No. 14/085,768; U.S. patent application Ser. No. 14/703,306; U.S. patent application Ser. No. 14/522,563; U.S. patent application Ser. No. 14/523,909; U.S. patent application Ser. No. 14/694,710; U.S. patent application Ser. No. 14/695,767; U.S. patent application Ser. No. 14/695,776; U.S. patent application Ser. No. 14/695,785; U.S. patent application Ser. No. 14/745,463; U.S. patent application Ser. No. 14/809,985; U.S. patent application Ser. No. 14/966,165; U.S. patent application Ser. No. 14/980,884; and U.S. patent application Ser. No. 15/171,922.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method of writing a substrate using multiple charged particle beams, comprising the actions of:
   writing multiple die-specific interconnect features to multiple dies on the substrate using one or more first charged particle beams in response to a secure portion of a design layout database, locations of said die-specific interconnect features determining bit values of non-volatile electronically readable data on said dies, different locations of said die-specific interconnect features corresponding to different bit values of said data being written to different ones of said dies; and
   writing multiple fixed-design interconnect features to said dies using one or more second charged particle beams, locations of said fixed-design interconnect features being specified by a design layout database of the substrate to be the same among said dies;
   wherein said die-specific writing and said fixed-design writing are performed independently and simultaneously by said first and second beams.

2. The method of claim 1, wherein said first beams also perform said fixed-design writing and said second beams also perform said die-specific writing.

3. The method of claim 1, wherein imaging of said die-specific features is performed only by charged particle beams of the tool performing said die-specific and fixed-design writing.

4. The method of claim 1, wherein ones of said bit values are used to enhance a random number generator function of corresponding ones of said dies.

5. The method of claim 1, wherein columns used to project said first and second beams are interchangeable.

* * * * *